(12) United States Patent
Lemaster et al.

(10) Patent No.: US 9,729,514 B2
(45) Date of Patent: Aug. 8, 2017

(54) METHOD AND SYSTEM OF A SECURE ACCESS GATEWAY

(71) Applicants: Robert K Lemaster, San Jose, CA (US); Duleep G. Pillai, Cupertino, CA (US)

(72) Inventors: Robert K Lemaster, San Jose, CA (US); Duleep G. Pillai, Cupertino, CA (US)

( * ) Notice: Subject to any disclaimer, the term of this patent is extended or adjusted under 35 U.S.C. 154(b) by 0 days.

(21) Appl. No.: 13/849,435

(22) Filed: Mar. 22, 2013

(65) Prior Publication Data

US 2014/0289830 A1 Sep. 25, 2014

(51) Int. Cl.
*H04L 29/06* (2006.01)
(52) U.S. Cl.
CPC ............ *H04L 63/029* (2013.01); *H04L 63/08* (2013.01)
(58) Field of Classification Search
CPC combination set(s) only.
See application file for complete search history.

(56) References Cited

U.S. PATENT DOCUMENTS

| | | | | |
|---|---|---|---|---|
| 6,041,357 A * | 3/2000 | Kunzelman | ......... | H04L 63/0815 709/228 |
| 7,653,200 B2 * | 1/2010 | Karmi | ................. | H04L 12/5692 380/270 |
| 8,533,802 B2 * | 9/2013 | Nandakumar | .......... | H04L 9/321 726/7 |
| 8,549,300 B1 * | 10/2013 | Kumar | ................... | H04L 9/3247 713/153 |
| 2002/0078212 A1 * | 6/2002 | Besaw | ....................... | G06F 9/44 709/228 |
| 2002/0159601 A1 * | 10/2002 | Bushmitch | .............. | H04L 29/06 380/277 |
| 2003/0005178 A1 * | 1/2003 | Hemsath | ................. | H04L 63/10 719/328 |
| 2004/0218587 A1 * | 11/2004 | Kim | ........................ | H04L 29/06 370/352 |

(Continued)

OTHER PUBLICATIONS

Adaikkalavan et al., SmartGate: A Smart Push-Pull Approach to Support Role-Based Security in Web Gateways, SAC, © 2001, 5 pages.*

(Continued)

*Primary Examiner* — Jeffrey Pwu
*Assistant Examiner* — Baotram Tran

(57) ABSTRACT

In one exemplary embodiment, a computer-implemented method of a secure-access gateway to a destination device in a protected computer network include the step of receiving a request from a remote user to access the destination device in the protected computer network. A session for the remote user is registered. The session includes an access to the destination device by the remote user according to a set of specified parameters controlled by the secure access gateway. The session is created. When the remote user connects and authenticates, the secure access gateway establishes the connection to the destination device on behalf of the remote user. The session is monitored according to the set of specified parameters. The session is monitored to determine if at least one specified parameters is achieved. The session between the remote user and the destination device is when terminated when the at least one specified parameters is achieved.

11 Claims, 6 Drawing Sheets

(56) References Cited

U.S. PATENT DOCUMENTS

| | | | |
|---|---|---|---|
| 2004/0268145 A1* | 12/2004 | Watkins | G06F 21/57 726/24 |
| 2005/0160098 A1* | 7/2005 | Campbell | G06Q 30/04 |
| 2005/0177515 A1* | 8/2005 | Kalavade | H04L 63/0853 705/52 |
| 2006/0168253 A1* | 7/2006 | Baba | H04L 9/3271 709/229 |
| 2006/0168264 A1* | 7/2006 | Baba | H04L 12/2809 709/230 |
| 2006/0291455 A1* | 12/2006 | Katz | H04L 29/06 370/355 |
| 2009/0296918 A1* | 12/2009 | Becker | H04M 7/0069 379/219 |
| 2011/0023108 A1* | 1/2011 | Geldermann | H04L 63/0263 726/13 |
| 2011/0093613 A1* | 4/2011 | Banes | H04L 29/06 709/238 |
| 2011/0093949 A1* | 4/2011 | Macrae | G06F 17/30864 726/19 |
| 2011/0246196 A1* | 10/2011 | Bhaskaran | G10L 17/24 704/235 |
| 2011/0307947 A1* | 12/2011 | Kariv | H04L 63/08 726/9 |
| 2012/0023167 A1* | 1/2012 | Hovdal | G06K 7/1095 709/204 |
| 2012/0023567 A1* | 1/2012 | Hammad | G06Q 20/12 726/9 |
| 2012/0036563 A1* | 2/2012 | Glasgow | H04L 63/083 726/5 |
| 2012/0072592 A1* | 3/2012 | Lidstrom | H04L 12/5695 709/224 |
| 2012/0331300 A1* | 12/2012 | Das | H04L 69/164 713/176 |
| 2013/0117816 A1* | 5/2013 | Dittrich | H04L 63/0807 726/4 |

OTHER PUBLICATIONS

Ehab Al-Shaer, Automated Management of Network Access Control from Design to Enforcement, SACMAT, © 2010, 1 page.*

Simon Aurell, Remote Controlling Devices Using Instant Messaging, Erlang, © 2005, 6 pages.*

Basney et al., Distributed Web Security for Science Gateways, GCE, © 2011, 8 pages.*

Donovan et al., NetAssay: Providing New Monitoring Primitives for Network Operators, SIGCOMM, © Aug. 2014, 2 pages.*

Godber et al., Secure Wireless Gateway, Wise, © 2002, 6 pages.*

Kong et al., ESCORT: A Decentralized and Localized Access Control System for Mobile Wireless Access to Secured Domains, Wise, © 2003, 10 pages.*

* cited by examiner

METHOD AND SYSTEM OF A SECURE ACCESS GATEWAY

CROSS-REFERENCE TO RELATED APPLICATIONS

This application is a claims priority to U.S. patent provisional application No. 61/614,210 titled METHOD AND SYSTEM OF A SECURE ACCESS GATEWAY filed on Mar. 22, 2012 filed. This provisional application is hereby incorporated by reference in its entirety.

BACKGROUND

1. Field

This application relates generally to computer networks and more particularly, the invention relates to for providing secure on-demand remote access to protected computer systems.

2. Related Art

As computer networks grow in size and diversity, and with the recent growth of regulations for securing access to protected computer systems, it has become an ongoing challenge to provide secure on-demand access to those computers for support and maintenance. Once access is enabled, it is also difficult to restrict the remote user to specific destination device using the current models. Different manufacturers have different methods for management (e.g. command-line applications, web interfaces, and Java clients). To make things more complex, different vendors often implement methods for remote access that conflict with other vendors or their customers' policies. Network operators have standard remote access methods (e.g. virtual private networks and access control lists). The needs of the device or software manufacturer often do not meet the implementations of the network operator. Network operators usually need to combine several separate functions to provide this access. This may include access control lists, virtual private networks, and one-time passwords. The described functionality can combine elements of a proxy, one-time password server, and a dynamic firewall to enable secure ad-hoc remote access to internal network devices within a secured network. It simplifies remote access while eliminating common security issues and administrative overhead. Its primary use is for permitting remote access and file transfer, but it can also be used as an internal tool to enable granular access control to network elements. The system may be implemented on a dedicated server appliance, on a gateway device such as a router, firewall, or VPN concentrator, or integrated with the management software for the device or application itself.

BRIEF SUMMARY OF THE INVENTION

In one exemplary embodiment, a computer-implemented method of a secure-access gateway to a destination device in a protected computer network includes the step of receiving a request from a remote user to access the destination device in the protected computer network. A session for the remote user is registered. The session includes an access to the destination device by the remote user according to a set of specified parameters controlled by the secure access gateway. The session is created. The session is monitored according to the set of specified parameters. The session is monitored to determine if at least one specified parameters is achieved. The session between the remote user and the destination device is then terminated when the at least one specified parameters is achieved.

BRIEF DESCRIPTION OF THE DRAWINGS

The present application can be best understood by reference to the following description taken in conjunction with the accompanying figures, in which like parts may be referred to by like numerals.

Figure 1:
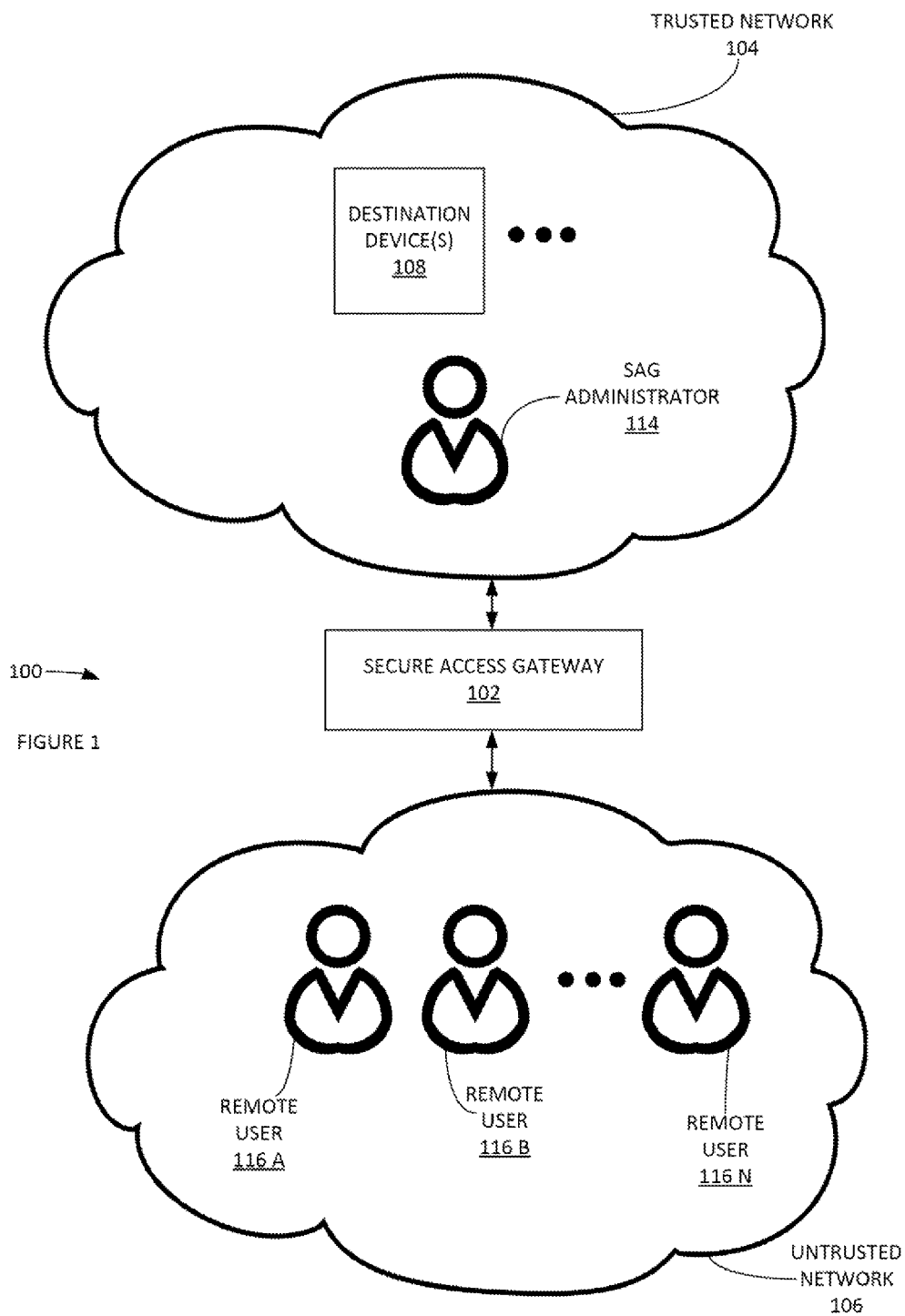
FIG. 1 depicts a block diagram of a system for providing secure on-demand remote access to protected computer systems, according to some embodiments.

The Figures described above are a representative set, and are not an exhaustive with respect to embodying the invention.

DESCRIPTION

Disclosed are a system, method, and article of manufacture for providing secure on-demand remote access to protected computer systems. The following description is presented to enable a person of ordinary skill in the art to make and use the various embodiments. Descriptions of specific devices, techniques, and applications are provided only as examples. Various modifications to the examples described herein may be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth in other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

EXEMPLARY ENVIRONMENT AND ARCHITECTURE

Definitions

As used herein, the following definitions can be utilized to implement certain example embodiments; however, other embodiments are not limited in this context.

Access control lists (ACLs) can be a configuration on a router, firewall, or other perimeter device that tells the device to permit or deny a request based on network or transport layer information. An example of an ACL is to permit access from any source internet protocol (IP) Address to a destination server on TCP 80. This ACL can be employed to permit access from the Internet to a web server on an internal network.

Active directory can be a directory service such as found in Microsoft Window®.

An administrator (e.g. a SAG administrator), for the purposes of this document, can be the person who defines policies and is responsible for access to protected computer systems.

An application programming interface (API) can act as middleware between multiple independent systems. An API can also enable separate systems using different hardware and software to communicate with each other (e.g. using an agreed upon language).

A darknet can be a routed, allocated IP space in which no active services reside. Because there are no services running on these IP addresses, no legitimate traffic should he sent to it and attempts to access services on these IPs can be assumed to he malicious. The darknet listens to traffic that it sees and logs it for further analysis.

A de-militarized Zone (DMZ) can be a network segment that is between the untrusted and trusted section of networks. It is used to deploy public facing services, such as web servers, A destination device can any device protected by a system defined in this document (e.g., system 100 infra) that a remote user would like access to. This may be a router, switch, firewall, server, or another type of device that runs an SSH HTTP HTTPS, remote access, or other server management protocol.

A firewall can be software or hardware that controls access to other computer systems within a secured network. A firewall can use ACLs, stateful inspection, intrusion detection/protection and other mechanisms to inspect and protect the traffic between trusted and untrosted networks or systems. A firewall can work primarily on the transport and network layers of the TCP/IP stack, but can work on other layers as well.

Hypertext Transfer Protocol Secure (MIPS) can provide encrypted communication between a client web browser and a web server.

An internet protocol (IP) address can be a numerical identifier of a computer connected to a TCP/IP network like the Internet. This address can be used to route traffic to and from other computers on a network.

Internet control message protocol (ICMP) can be implemented in the operating systems of networked computers to relay status messages between systems. The most commonly used example is a ping, used to tell if a networked system is up and able to respond to requests.

Kerberos can be a client-server protocol that provides encrypted authentication and mutual authentication between the user and server. Kerberos may be implemented in Microsoft Windows® and Unix operating systems including Solaris®, Red Hat® Linux, and Mac OS X®.

Lightweight directory access protocol (LDAP) can be a method of accessing and maintaining directory information on an IP network.

Multi-factor authentication can be a method of using two or more authentication methods to authenticate to a system. Types of factors can include something a user knows (e.g.; a password), something a user has (e.g.; a token, one-time password, smart card, or public/private key pair), or something a user is (e.g.; a biometric scan of a fingerprint or iris scan). The location of a user (e.g.; a source IP address or GPS coordinate) can also be used in some cases. Multi-Factor authentication may be implemented for compliance standards such as PCI-DSS.

A one-time password can be a password that can only be used once, and becomes invalid immediately after it has been used. Because of this, it is the most secure type of password. One-time passwords may consist of a string of numbers, letters, or non-alphanumeric characters. One-time passwords can be generated manually by an administrator, or can be generated, continually with a device or software.

A proxy can be software or hardware that sits between two networks or applications and makes a connection to a device or application on behalf of another user or application. Proxies can typically work primarily in the higher levels of the TCP/IP stack.

A public key infrastructure (PKI) can be a method used to authenticate to devices. A public/private key pair can be generated by a client such as a terminal emulator. While the two are related, a private key cannot be computed from a corresponding public key. The private key is kept locally, and the public key is stored on the server. When the server receives a connection from a user, it verifies that the public key corresponds to the private key on the user's system, and access is granted.

A remote user can be a user that requests access to an internal resource that is protected by the System defined in this document. The remote user may be from the same or different organization as the administrator, and may be connecting from within the same network, a separate network connected by VPN, or a completely different network on the other side of the world.

Secure Copy (SCP) can be a means of securely transferring computer files between a two hosts. SCP is based on the secure shell (SSH) protocol.

SSH can be a network protocol for secure data communication, remote shell services or command execution and other secure network services between two networked computers.

S/FTP can be a network protocol that provides secure file transfer over SSH.

Terminal access controller access-control system plus (TACACS+) can be an access control network protocol for routers, network access servers and other networked computing devices.

A token can be an object that specifies access rights assigned to a subject. The term is also used to describe a hardware device or software that can generate one-time passwords. In some cases, the words token and one-time password can be used interchangeably. For the purposes of this functionality, token can be used to describe a one-time password string that specifies the access rights assigned to a subject for a specified session.

Tail can be a program on Unix and Unix-like systems can be used to display the last few lines of a text file or piped data.

A virtual private network (or VPN) can be a way of connecting two or more networks, or connecting a remote user to a network securely. Traffic going between the networks is typically encapsulated, segregated, and encrypted to prevent third parties from reading the traffic in transit. Authentication is used to verify each end of the connection. There are several methods and protocols used to create VPNs. The most common methods currently used are IPSec and SSL. IPSec is the standard for setting up permanent access between networks and is also commonly used for remote access. SSL VPNs are a more convenient method of providing remote access, especially for mobile users. SSL VPNs may provide a web (HTTPS) interface to applications on the trusted network, and/or may provide a downloadable ActiveX Control or Java Applet that can be downloaded and run like an IPSec client. SSL VPNs may also operate like an IPSec VPN, but use SSL as the transport mechanism, FIG. 1 depicts a block diagram of a system 100 for providing secure on-demand remote access to protected computer systems, according to some embodiments. System 100 can include a secure access gateway (SAG) 102. SAG 102 can combine various communication protocols such as SSH or HTTPS with elements of a proxy, a Firewall, and/or a one-time password SAG 102. A network with destination hosts on the inside of a protected network (e.g., trusted network 104) and users on an external network such as the Internet. When SAG 102 is deployed, it can enable secure on-demand one-time access to those internal destination hosts from an external host. SAG 102 can be a proxy between the remote user 116 A-N and the destination device(s) 108. To the remote user, it can appear as if he or she is connecting directly to the destination device(s) 108 (e.g. any device with trusted network 104, etc.), but this connection is actually being provided by the proxy service. Because this connection to the destination device 108 is being made by SAG 102 on behalf of the remote user (e.g. remote users 116 A-N), the remote user 116 A-N cannot directly access the destination device 108's username or password, and thus the destination device 108 can remain secured. This enables the remote user 116 A-N to connect to a destination device 108 on a secured network just as easily as connecting on his/her local LAN, and it enables the destination LAN (e.g., trusted network 104) to easily provide access with several additional layers of security.

Dynamic host ACLs may be used to prevent any connection attempts (including Internet Control Message Protocol (ICMP) traffic), except from source IP Addresses and/or subnets that may have been specifically authorized by the SAG administrator 114 during a session registration. In some embodiments, SAG administrator 114 can be algorithmically implemented as a set of instructions and/or user inputs. When an IP address is used during registering a session, if a subnet mask is not specified, a single host address can be assumed. The SAG administrator 114 may implement a specified subnet mask (e.g. IPv4/24 or smaller subnets), or may allow certain subnets to be used.

The SAG administrator 114 may configure static ACLs within the service. This enables the SAG administrator 114 to permit access to trusted subnets whenever a session is active. These ACLs can be open for all active sessions and are disabled when there are no active sessions. The static ACLs may include a "wildcard" statement to allow remote users from any source IP. The SAG administrator 114 may also choose to configure the static ACLs to override any dynamic (e.g. session) ACLs entered during registration. This would prevent other users from registering sessions from unauthorized subnets. If this option is chosen, the session ACL prompt may be removed from the registration process because it is no longer relevant.

If an SAG administrator 114 registers a session without specifying a remote IP address, the static ACLs can be applied to the active sessions. Once the active sessions have expired, no remote connections can be allowed.

An additional ACL may be automatically added by the system 100 to block a particular remote host (e.g. associated with a remote user 116 A-N) if the system receives a specified amount of failed authentications from that host within a specified time period. The ACL can be automatically removed after a specified period of time. This can reduce brute force login attempts. By adding an ACL instead of cancelling the session ID, this can prevent a denial of service attack.

The SAG administrator 114 may configure the system to implement that the user enter a dynamic ACL and may implement the length of the subnets that can be used (e.g. IPv4/24 or smaller subnets)

The system can be used with static usernames and passwords used on the destination device 108. When SAG 102 is configured with static usernames, the remote user's credentials are translated to the static credentials by the proxy when the connection is made. These static usernames may be configured on the local device or on an external database.

The SAG administrator 114 may implement the remote user 116 A-N to also authenticate to external databases such as Active Directory, Kerberos, LDAP, SQL, RADIUS, or TACACS+ in addition to the token authentication. This can be useful in some scenarios where the one-time password is sent by unencrypted email, and/or if the system is used for internal users, or to add an additional authentication factor. In some circumstances where a third party user database is used, that third party database username may be used instead of the session username.

Authentication may not be limited to static usernames and passwords. Instead of relying on preconfigured user accounts within the external user database, it can write the session credentials to the external database and then remove them once the session is completed. This would allow SAG 102 to log the unique session name in the third party logs including the username of the SAG administrator 114 who authorized the session. It could also enable creating the temporary account within the authorization scheme on the third party database.

In some cases, the SAG 102 may be configured not to authenticate to the destination device 108 on behalf of the remote user 116 A-N and implement the remote user 116 A-N to authenticate directly to the destination device 108. Public keys can be used for authentication using SSH or HTTP/HTTPS. To use public keys for authentication, as copy of the remote user's public key can be stored on SAG 102.

Tokens can be generated by the SAG 102 service. Tokens can be random strings of characters which may include letters, numbers, and non-alphanumeric characters. The number of tokens generated for each user session may be configured by the SAG administrator 114 during user registration. For example, each token may be used once. The token can be used to authenticate the remote user 116 A-N and to match a connection profile used in a session. The connection profile is an association of the session identifier, remote user, ACLs, session timeouts, destination device 108, login credentials (e.g. username, password, etc.), and authorization profile (if used).

SAG 102 may add an additional authentication step by using a one-time password generating hardware device, software loaded on the remote user's computer, and/or an application installed on the remote user's smart phone or mobile device.

SAG 102 may add an additional authentication step via a telephone call and/or SMS message to a landline phone and/or smart phone. The telephone call and/or SMS message may include a token or PIN, and/or prompt the remote user 116 A-N to respond by entering a number or string to confirm his or her identity.

Session timeouts may be implemented by defining a start and end date and time, and/or may be automatically activated upon registration and deactivated after a certain period of time after registration, and/or after the remote user's first login. After the session has timed out, SAG 102 can either allow the remote user 116 A-N to complete his or her work, but not allow any further sessions or to log out the remote user 116 A-N immediately regardless if he or she has completed his or her work. SAG 102 may send warnings to the remote user 116 A-N when the session gets closer to ending.

As SAG 102 acts as a proxy, it has the ability to view all commands entered by the remote user 116 A-N and returned by the destination device 108 and store them in SAG 102. This can enable the SAG administrator 114 to review the logs and see the commands entered by the remote user. The SAG administrator 114 may use a program such as 'tail' to view the logs to view the session in real time. The system may be configured to log the commands sent by the remote user 116 A-N to the destination device(s) 108, or the commands sent by the remote user 116 A-N and the responses received from the destination device 108. The logs may include the name of the SAG administrator 114 who authorized the session and output from commands that are configured to be run when the remote user 116 A-N connects to the destination device 108. These logs may be used to display the differences between previous and current configurations. These logs may also be automatically emailed by the system to the SAG administrator 114 and/or the remote user 116 A-N after the user session is complete.

Primary communication mechanisms can include SSH for command line applications or Secure HTTP (e.g. HTTPS/SSL/TLS) for web interfaces, but this functionality may also be used for remote desktop applications or even integrated into other client-server applications, such as Java applets or ActiveX controls.

This functionality is not limited to configuration and monitoring of systems. In some deployments, it could also be used for remote file transfer using protocols such as S/FTP, SCP, or HTTP PUT.

Destination device profiles can be used to define different destination devices such as destination device(s) 108. The destination device configuration can include host IP addresses, usernames, and passwords for the destination device 108. If the username and password are left blank, the remote user 116 A-N can be prompted to enter this information. The device profile may be used to run a list of commands when first logging in. When used, these commands and their output may not he shown to the remote user, but can be logged as a part of the session. Because different devices can have different types of authentication and login prompts, this information can be stored in a profile for each destination device 108. Destination device(s) 108 may be organized into device groups to simplify administration. They may also include authorization profiles that may be used for the devices and remote hosts that may access the destination device 108.

Authorization profiles may he implemented by the SAG 102 service. Because the remote user 116 A-N is sending commands to SAG 102 instead of directly to the destination device 108, SAG 102 has the ability to review commands and deny or permit them before being sent to the destination device 108. This may be configured by a series of permit/deny statements in the SAG 102 configuration. Multiple authorization profiles (e.g.; read-only or read-write) may be configured for different destination devices and these profiles may he chosen by the SAG administrator 114 during registration.

User profiles can include authentication information, such as static username, password and/or third party authentication method. The user profile may be used to restrict the sessions that internal users may register for a remote session. This would give the SAG administrator 114 the ability to delegate registration to specified users, but only allow them to register sessions for specified destination device 108 and/or destination device groups and with specified authorization profiles. For example, the SAG administrator 114 may allow a certain group to register sessions for one vendor's systems in a given location and with read-only permissions. Additionally, a user profile may include source ACLs that restrict which source networks may be authorized for a remote session. Users (e.g. such as remote users) may be organized into groups to simplify administration.

SAG 102 can support many simultaneous user sessions from different source IP addresses to different destination device 108. Each session can have unique tokens and may be configured for a different remote user 116 A-N and destination device 108. This is possible because the remote users are logging into a proxy service. Once the tokens for those sessions have expired, new sessions can be registered for additional sessions to take place. The TCP ports may be standardized and/or may be randomized to discourage malicious logins.

Session Registration

In order for a remote user 116 A-N to have access to a destination device 108, the SAG administrator 114 can register a session beforehand in SAG 102. The session may be registered from the command line, from a GUI and/or from a third party API or application (or even from a mobile device). When a session is registered, certain parameters can be set for the session. Some of these parameters may be set to global defaults or made optional within the global configuration.

Each user session can be assigned a unique descriptive session identifier by the SAG administrator 114. This can be a descriptive name to identify the session and can be logged (e.g. with SAG 102). It may be a service request, ticket number, vendor name, remote user's name, and/or a combination thereof. This can be used by the remote user 116 A-N when prompted during login. This may not be needed in some circumstances if the session is configured to use a third party authentication system. An additional third party authentication system (e.g.; Kerberos, Active Directory, LDAP, TACACS+) or identity provider to be used (e.g. if implemented).

The destination device(s) 108 can be the internal device the SAG administrator 114 wishes to connect with the remote user 116 A-N using SAG 102. This can include a full host IP address or hostname (e.g. if configured locally or in DNS). Which host to use can be assigned when the remote user 116 A-N connects with SAG 102. SAG 102 can prevent the remote user 116 A-N from connecting to any other devices during the session. Several possible protocols can be used for the connection such as SSH and/or HTPPS, and the like. A number of logins may be allowed. This can generate one or more tokens per login.

Time limits of the session may include start timeidate, end time/date, and/or expiration period from first login or from registration. The time limits may allow the remote user 116 A-N to complete his or her work, but not allow any further sessions, or may log out the remote user 116 A-N regardless of whether his or her work is done.

The authorized source IP address or subnet (e.g. external ACL) can be the remote IP address or subnet that can be authorized to connect to the SAG 102 service. If CIDR notation (e.g. '/') is not used to specify a subnet, a single host address can be assumed. The service can ignore any other source IP address and can appear invisible on the external network interface unless a connection is attempted from a registered IP or subnet. A preconfigured authorization profile may be applied to the session which would include permit/deny statements for commands entered on the destination device 108.

The tokens and login instructions may be sent directly by email to the remote user 116 A-N in addition to, or instead of, providing this information to the SAG administrator 114 during registration. By sending the instructions directly to the remote user 116 A-N instead of giving it to the SAG administrator 114, the registration process can be simpler for the SAG administrator 114, and it may be more difficult for a malicious user to impersonate a remote user 116 A-N, and enforces separation of duties. The remote user's email application can also request authentication by username & password, which adds an additional authentication step. The instructions may be emailed as a meeting invitation that can be downloaded into a calendar application. An API may be used to integrate SAG registration with third party applications such as ticketing systems.

System Operation

When the SAG administrator 114 registers the session, the system can take the following steps. The system can generate tokens for the remote user 116 A-N. The system opens a host ACL for the remote user's IP address and waits for a connection. The system can email instructions to the remote user 16 A-N (optional). When the remote user 116 A-N connects, SAG 102 can take the following steps. SAG 102 verifies that the remote user's IP address matches an existing static or dynamic (session) ACL. If it does not match, the request can be ignored. SAG 102 can verify the remote user's second authentication factor (e.g. if used). SAG 102 can prompt the remote user 116 A-N for session login and token.

Once the token is used, it can be deleted (e.g. immediately deleted) and cannot be used again. SAG 102 can prompt the remote user 116 A-N for authentication credentials from a third party database (if used). SAG 102 can use the token to look up the association between remote user 116 A-N, destination device 108, and authorization profile (e.g. if used). SAG 102 can establish a proxy connection between the destination device 108 and the remote user 116 A-N. SAG 102 can log into the destination device 108 using the information stored in the device Profile. SAG 102 can 'proxy' the destination device 108's interface back to the remote user 116 A-N.

The system logs the commands entered by the remote user 116 A-N and the replies from the destination device 108 if supported by the protocol and configured by the SAG administrator 114.

Once the remote user 116 A-N has completed work and exits or if the connection times out or is manually disconnected), SAG 102 takes the following steps:

1. SAG 102 can disconnect from the destination network device.

2. If the SAG administrator 114 has configured multiple tokens for this user, the ACL can remain open for additional sessions, otherwise, it is removed.

3. Once the expiration time or date has been met, all connections can be terminated, the tokens can be deleted, and the ACL can be closed.

SAG 102 may include administrative commands to monitor ongoing sessions. This may include displaying sessions, ACLs, manually terminating, sessions, and sending messages to remote users 116 A-N.

In some embodiments, SAG 102 can allow secure connections without a pre-existing session registered by the SAG administrator 114. A remote user 116 A-N may have a profile configured on the system which may enable him or her to authenticate securely as needed to the system and then use that system to connect to another system securely. This can help minimize ACLs on the destination device 108 and add multi-factor authentication to systems that don't support it on their own.

In some embodiments, a darknet interface may be configured to monitor incoming traffic. This traffic may be logged for further analysis with source/destination, ports, and other information. SAG 102 may generate reports on volume of traffic, ports hit, etc. and generate email alerts to the SAG administrator 114 when traffic increases significantly. This information may be sent back to a central location where it can be aggregated with similar information from other systems. This information may be used to automatically configure other interfaces on this SAG 102 or on other systems to drop any requests from these sources for a specified amount of time.

Figure 2:
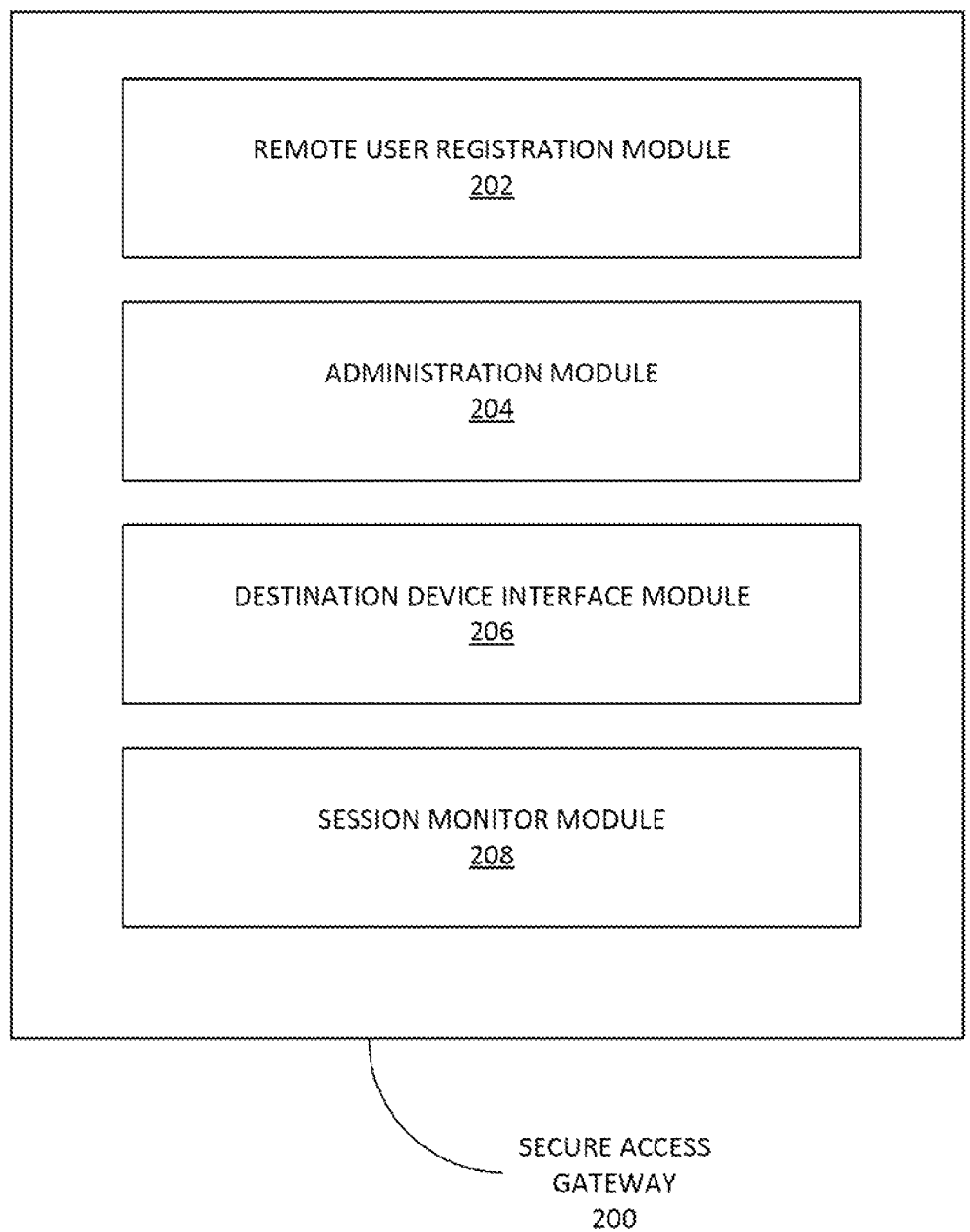
FIG. 2 depicts, in block diagram format, an example secure access gateway system, according to some embodiments.

FIG. 2 depicts, in block diagram format, an example secure access gateway system 200, according to some embodiments. SAG 200 can include remote user registration module 202. Remote user registration module 202 can be used by an administrator (e.g. SAG administrator 114) to register a remote session. Remote user registration module 202 can create a session id. Remote user registration module 202 can generate tokens and provide said tokens to a remote user. Remote user registration module 202 can open an ACL The ACL can permit the remote user to access the destination device (e.g. via the SAG). The Remote user registration module 202 can send the login information to the remote user (i.e. the remote user's computing device). Administration 204 can include a set of instructions that administer the SAG 200. Administration 204 can manage the other SAG modules and operations. Administration 204 can be used by a user to set administrator parameters and protocols (e.g. can provide a dashboard view of the system). Destination device interface module 206 can receive requests from the remote user and pass said requests to a destination device. Likewise, destination device interface module 206 can then pass the responses back to the remote user. Destination device interface module 206 can interact with a destination device according any other implementation described herein. Session monitor module 208 can monitor ongoing sessions according to current administrative commands. This may include, inter alia, displaying sessions. ACLs, manually terminating sessions, and sending messages to remote users. The various modules described can implement additional functionalities according to other embodiments described herein.

Exemplary Processes

Figure 3:
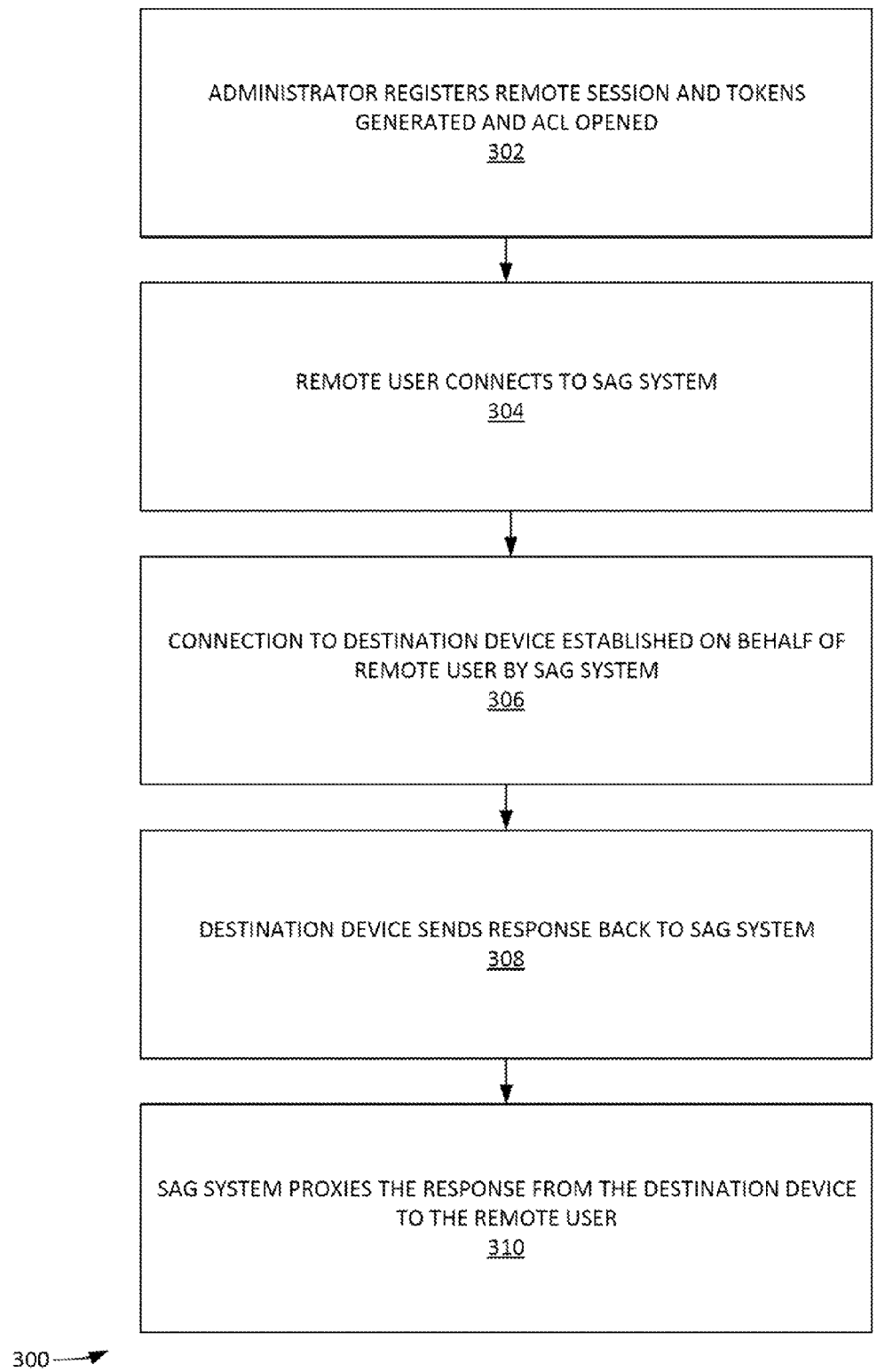
FIG. 3 depicts a block diagram of a process for providing secure on-demand remote access to protected computer systems, according to some embodiments.

FIG. 3 depicts a block diagram of a process 300 for providing secure on-demand remote access to protected computer systems, according to some embodiments. In step 302 of process 300, an administrator (e.g. SAG administrator 114) registers a remote session. A session id can be created. Tokens can be generated. ACL can be opened. The ACL permits the remote user to access the destination device. The SAG may send the login information to the remote user (i.e. the remote user's computing device). In step 304, the remote user connects to the SAG system (e.g. as provided supra). The remote user can connect to the SAG and via the SAG to the destination device using the protocol specified during registration. In step 306, a connection to the destination device is established on behalf of the remote user by the SAG system. When the Remote User enters the Session ID and an authorized token, the SAG determines its registration database and verifies that the session id and token are correct and from this combination, knows which destination device to create a connection to for the remote user. Each Token may only be used one time. After that, it may no longer be valid for that Session. In step 308, the destination device sends a response back to the SAG system. In step 310, the SAG system proxies the response from the destination device back to the remote user. SAG connects to the destination device on behalf of the remote user and redirects its output back to the remote user. The remote user connects through the SAG and performs the needed work. When the remote user disconnects, or uses up the assigned tokens and/or the session times out, the remote user may need to request that the SAG register a new session for him or her to connect again.

Figure 4:
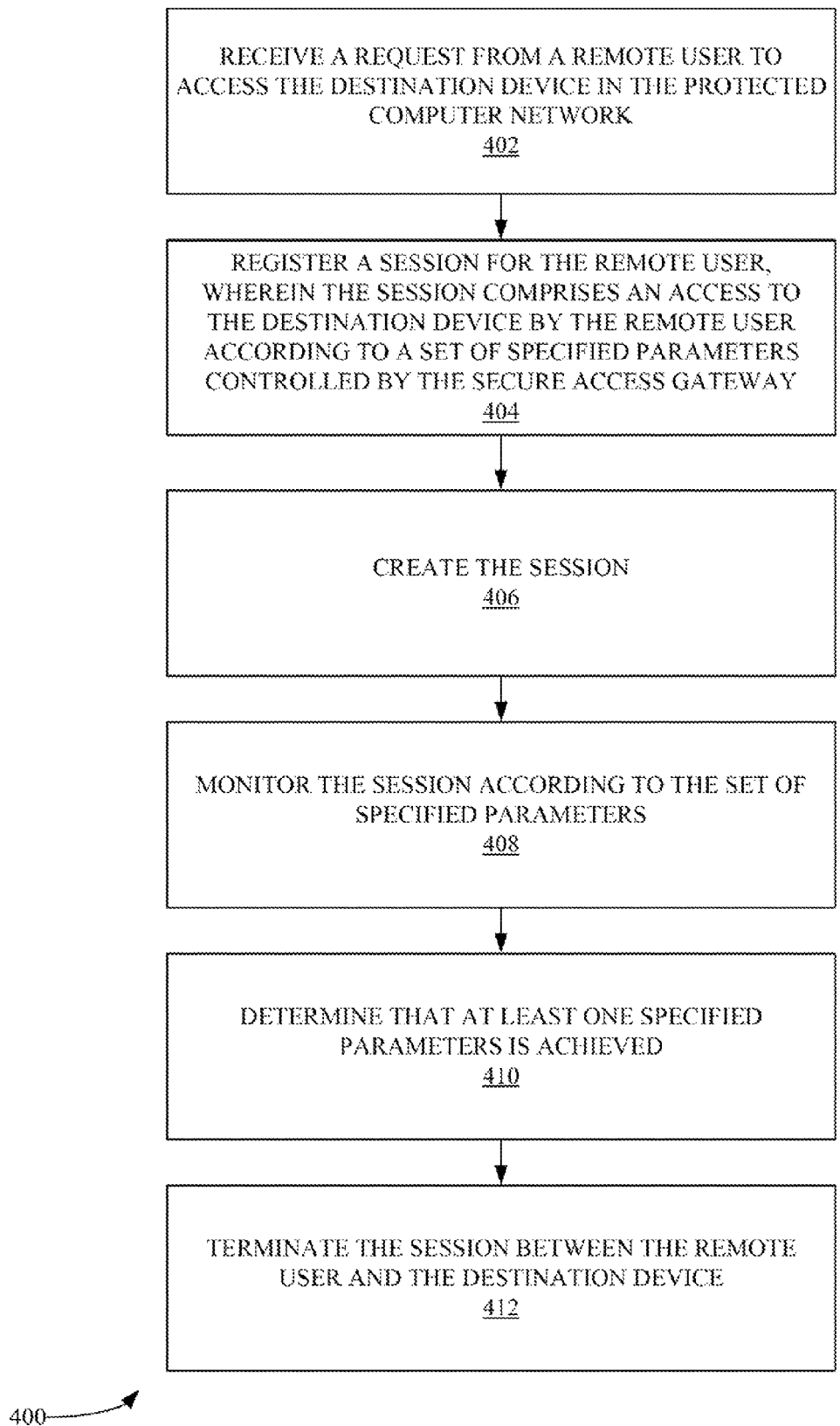
FIG. 4 illustrates a process for providing secure on-demand remote access to protected computer systems, according to some embodiments.

FIG. 4 illustrates a process 400 for providing secure on-demand remote access to protected computer systems, according to some embodiments. In step 402 of process 400, a request from a remote user to access the destination device in the protected computer network is received. In step 404, the session for the remote user is registered. The session includes an access to the destination device by the remote user according to a set of specified parameters controlled by the secure access gateway. In step 406, the session is created. In step 408, the session is monitored according to the set of specified parameters. The session is monitored to determine if at least one specified parameters is achieved. In step 410, the session between the remote user and the destination device is then terminated when the at least one specified parameters is achieved.

In yet another exemplary process, the SAG system can facilitate an administrator to provide secure on-demand access to destination devices within a protected network. The remote user may only be allowed to connect from specified remote addresses, during specified periods, and only the exact number of times that for which the administrator has configured each session. The remote user may only connect to one destination device per session. Each session can be automatically removed when the work is done, so the administrator does not have to go back and manually remove sessions. The SAG system may also be configured to deny commands that the administrator does not want the remote user to be able to access. The SAG system may be implemented with minimal changes to the existing network infrastructure. The SAG system can also facilitate ease of use by remote users, because the remote user can use existing software. From the remote user's perspective it will appear as if the destination device is accessible from their network and they are connecting directly to it instead of through an intermediary device.

Exemplary Use Cases

In one example, a malicious user may try to gain access to a destination device in a protected network. First, the SAG can be invisible to the Internet when there are no sessions registered. The IP interface may not respond to any requests. The interface may also be configured to ignore any TCP/IP request (e.g. an ICMP). There may be no way to determine from the Internet that there is actually SAG running with that IP address. Once a session is registered, the SAG may configure it so that the interface is now reachable and may respond to requests, but only to specified authorized IPs or subnets. Once an authorized user connects to the SAG, that user may need to know 1) a session ID and 2) one of the randomly generated one-time tokens randomly generated by the SAG. These one-time tokens may only be used once and may not be reused. If an additional factor is configured by the SAG, the remote user may also need to use that factor to authenticate in addition to having an authorized IP address, session ID, and one-time token. That additional factor may be a smartphone, a smart phone application, software loaded to a personal computer (PC) and/or other implementations. Once the remote user has completed his work and/or the SAG times out, that remote user may not be permitted access until a new session is registered by the SAG. It is noted that SAG can limit a remote user to certain specified commands to be used with the destination device. SAG can filter incoming remote user commands intended for the destination device and ensure only authorized commands are provided to destination device. The list of valid destination device commands can be configured in authorization profiles. When the remote user connects and authenticates, the secure access gateway establishes the connection to the destination device on behalf of the remote user.

Figure 5:
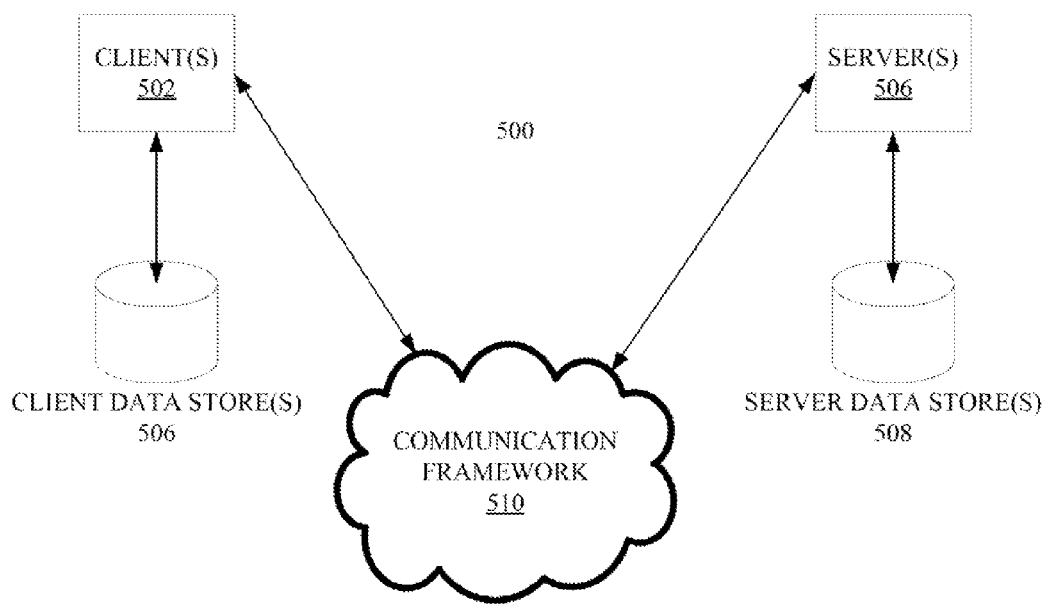
FIG. 5 is a block diagram of a sample computing environment that can be utilized to implement some embodiments.

FIG. 5 is a block diagram of a sample computing environment 500 that can be utilized to implement some embodiments. The system 500 further illustrates a system that includes one or more client(s) 502. The client(s) 502 can be hardware and/or software (e.g., threads, processes, computing devices). The system 500 also includes one or more server(s) 504. The server(s) 504 can also be hardware and/or software (e.g., threads, processes, computing devices). One possible communication between a client 502 and a server 504 may be in the form of a data packet adapted to be transmitted between two or more computer processes. The system 500 includes a communication framework 510 that can be employed to facilitate communications between the client(s) 502 and the server(s) 504. The client(s) 502 are connected to one or more client data store(s) 506 that can be employed to store information local to the client(s) 502. Similarly, the server(s) 504 are connected to one or more server data store(s) 508 that can be employed to store information local to the server(s) 504.

In some embodiments, system 500 can be include and/or be utilized by the various systems and/or methods described herein to implement process 100. For example, the specified content of step 102 can be stored in 506 and/or 508. User login verification can be performed by server 504. Client 502 can be in an application (such as a web browser, augmented reality application, text messaging application, email application, instant messaging application, etc.) operating on a computer such as a personal computer, laptop computer, mobile device (e.g. a smart phone) and/or a tablet computer. In some embodiments, computing, environment 500 can be implemented with the server(s) 504 and/or data store(s) 508 implemented in a cloud computing environment.

Figure 6:
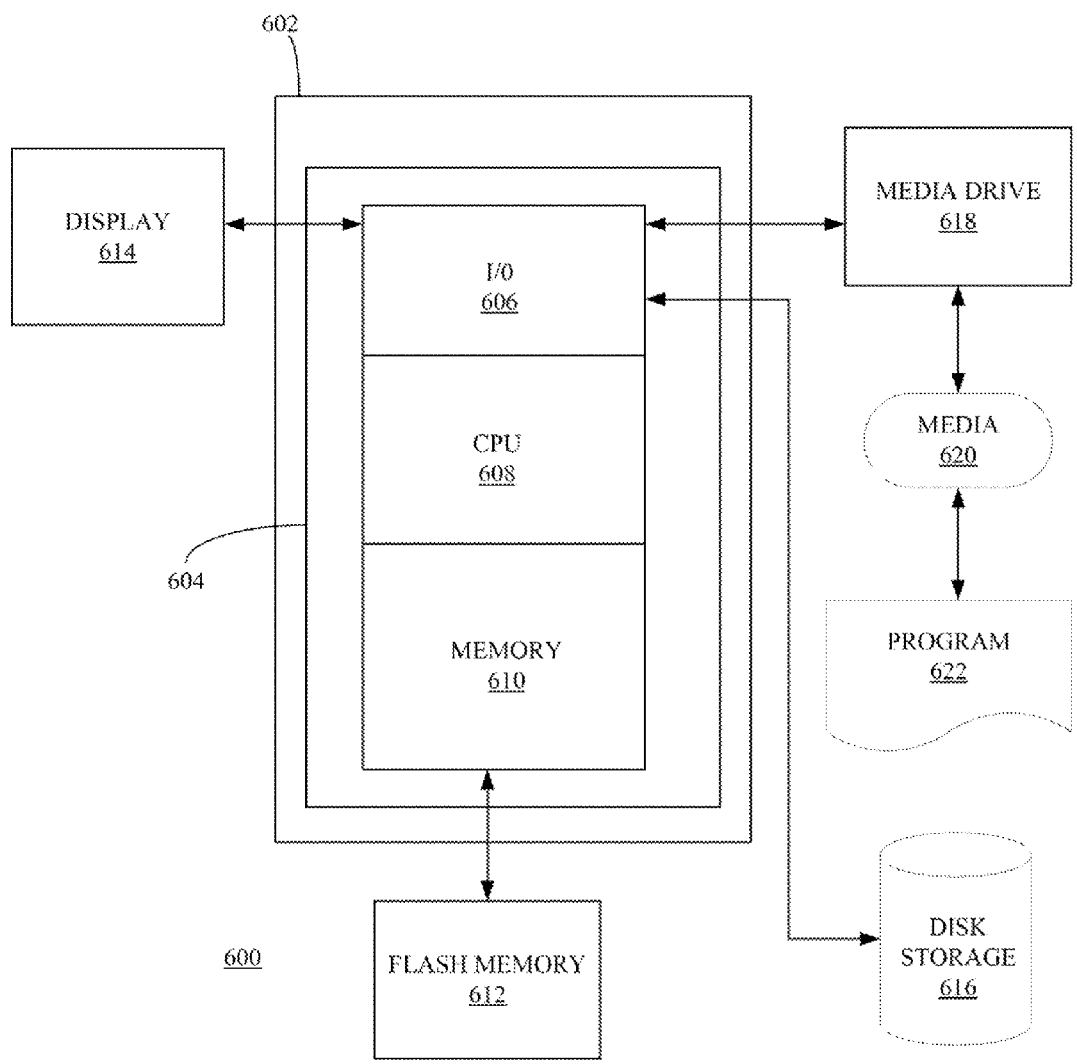
FIG. 6 depicts an exemplary computing system that can be configured to perform any one of the processes provided herein.

FIG. 6 depicts an exemplary computing system 600 that can be configured to perform any one of the processes provided herein. In this context, computing system 600 may include, for example, a processor, memory, storage, and I/O devices (e.g., monitor, keyboard, disk drive, Internet connection, etc.). However, computing system 600 may include circuitry or other specialized hardware for carrying out some or all aspects of the processes. In some operational settings, computing system 600 may be configured as a system that includes one or more units, each of which is configured to carry out some aspects of the processes either in software, hardware, or some combination thereof.

FIG. 6 depicts computing system 600 with a number of components that may be used to perform any of the processes described herein. The main system 602 includes a motherboard 604 having an I/O section 606, one or more central processing units (CPU) 608, and a memory section 610, which may have a flash memory card 612 related to it. The I/O section 606 can be connected to a display 614, a keyboard and or other user input (not shown), a disk storage unit 616, and a media drive unit 618. The media drive unit 618 can read/write a computer-readable medium 620, which can contain programs 622 and/or data. Computing system 600 can include a web browser. Moreover, it is noted that computing system 600 can be configured to include additional systems in order to fulfill various functionalities. In another example, computing system 600 can be configured as a mobile device and include such systems as may be typically included in a mobile device such as GPS systems, gyroscope, accelerometers, cameras, augmented-reality systems, etc.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it may be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense, In some embodiments, the machine-readable medium can be a non-transitory form of machine-readable medium.

What is claimed as new and desired to be protected by Letters Patent of the United States is:

1. A computer-implemented method of a secure-access gateway to a destination device in a protected computer network comprising:
  receiving a request from a remote user to access the destination device in the protected computer network;
  registering a session for the remote user, wherein the session comprises an access information to the destination device by the remote user according to a set of specified parameters controlled by the secure access gateway;
  creating the session;
  monitoring the session according to the set of specified parameters;
  determining that at least one specified parameters is achieved; and
  terminating the session between the remote user and the destination device, wherein at least one of a login username or a password is entered by the secure access gateway, wherein an additional authentication step is implemented using a short message system (SMS) message,
  wherein the set of specified parameters comprise at least one of source subnet, a second authentication factor, a destination device Internet Protocol (IP) address a destination device host name or IP address, a destination device login credentials, a specified protocol, a specified number of login tokens, an authorization profile, or a period of access to the destination device via the secure access gateway,
  wherein each login to the secure access gateway uses a token, and wherein each token can only be used once,
  wherein each token is automatically generated by secure access gateway and provided to the remote user as a result of a registration process,
  wherein the token comprises a string of random alphanumeric text or non-alpha numeric characters,
  wherein the secure access gateway logs into the destination device on behalf of the remote user when the remote user provides the secure access gateway a session identifier and a token, and
  wherein a remote user remote is permitted to connect to one destination device per session.

2. The computer-implemented method of claim 1, wherein the login credentials for the destination device is included in the session registration.

3. The computer-implemented method of claim 1, wherein the login credentials for the destination device are saved in a secure access gateway server.

4. The computer-implemented method of claim 1, wherein the remote user provides the secure access gateway a session id and token before the secure access gateway accesses the destination device on behalf of the remote user.

5. The computer-implemented method of claim 4, wherein the remote user provides the secure access gateway a second authentication factor before the secure access gateway accesses the destination device on behalf of the remote user.

6. The computer-implemented method of claim 5, wherein the second authentication factor comprises at least one of a pin or a one-time password or a public/private key pair.

7. A computer system for implementing a secure-access gateway to a destination device in a protected computer network, the system comprising:
  memory configured to store a set of instructions used to implement the secure-access gateway; and
  one or more processors configured to:
  receive a request from a remote user to access the destination device in the protected computer network;
  register a session for the remote user, wherein the session comprises an access information to the destination device by the remote user according to a set of specified parameters controlled by the secure access gateway;
  create the session;
  monitor the session according to the set of specified parameters;
  determine that at least one specified parameters is achieved; and
  terminate the session between the remote user and the destination device,
  wherein at least one of a login username or a password is entered by the secure access gateway,
  wherein an additional authentication step is implemented using a short message system (SMS) message,
  wherein the set of specified parameters comprises at least one of source subnet, a second authentication factor, a destination device Internet Protocol (IP) address, a destination device hostname or IP address, a destination device login credentials, a specified protocol, a specified number of login tokens, an authorization profile, or a period of access to the destination device via the secure access gateway,
  wherein each login to the secure access gateway uses a token, and wherein each token can only be used once,
  wherein each token is automatically generated by secure access gateway and provided to the remote user as a result of a registration process,
  wherein the token comprises a string of random alpha-numeric text or non-alpha numeric characters,
  wherein the secure access gateway logs into destination device on behalf of the remote user when the remote user provides the secure access gateway a session identifier and a token,
  wherein a remote user remote is permitted to connect to one destination device per session, and
  wherein the remote user provides the secure access gateway a second authentication factor before the secure access gateway accesses the destination device on behalf of the remote user.

8. The computer-implemented system of claim 7, wherein a login credential for the destination device is included in the session registration.

9. The computer-implemented system of claim 7, wherein the login credential for the destination device is saved in a secure access gateway server.

10. The computer-implemented system of claim 7, wherein the remote user provides the secure access gateway a session identification (id) and token before the secure access gateway accesses the destination device on behalf of the remote user.

11. The computer-implemented system of claim 7, wherein the second authentication factor comprises at least one of a pin or a onetime password.

* * * * *